B. Q. P. FOSS.
APPARATUS FOR DESULFURIZING AND TREATING ORE.
APPLICATION FILED JULY 22, 1914.
1,338,292.
Patented Apr. 27, 1920.
5 SHEETS—SHEET 1.
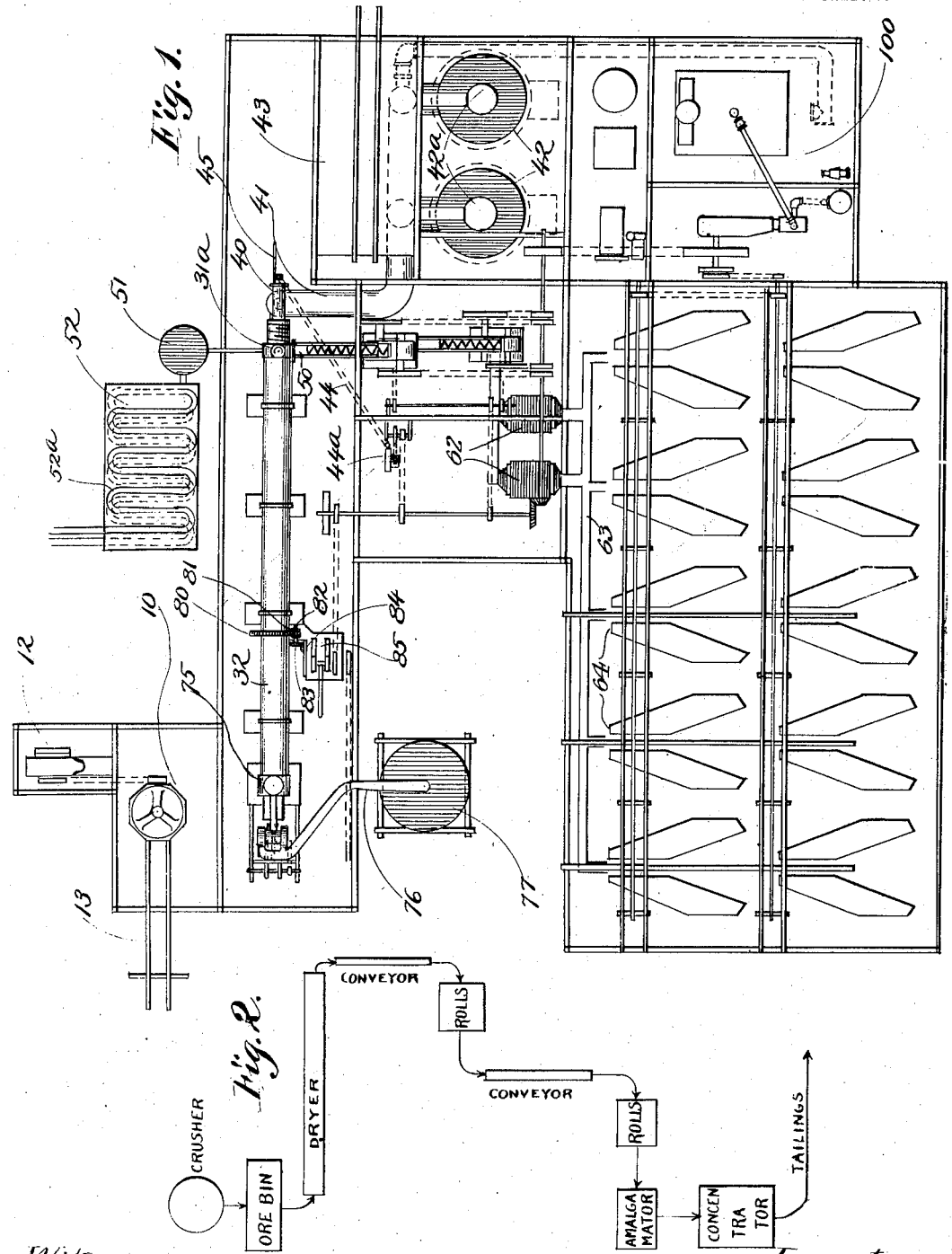

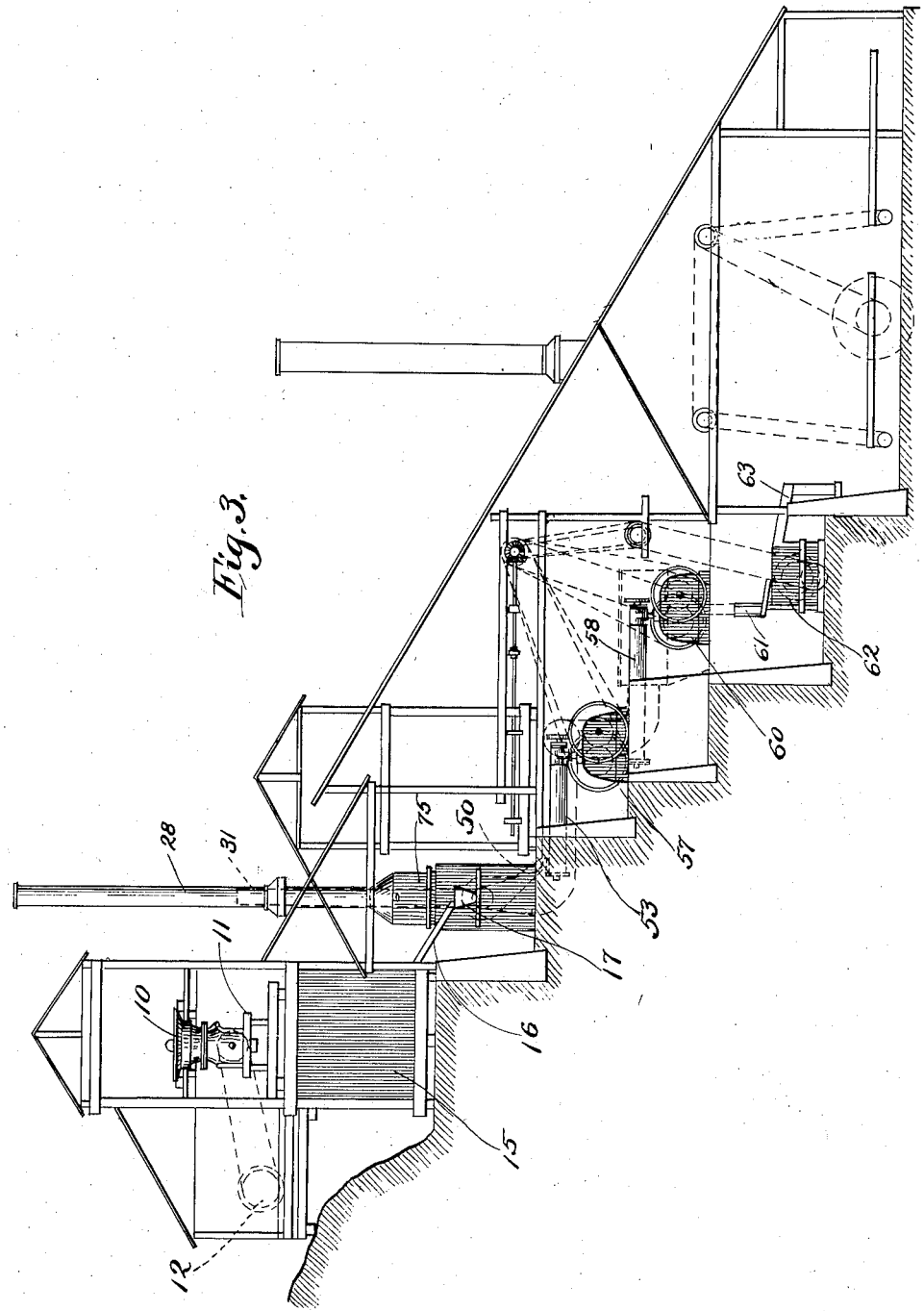

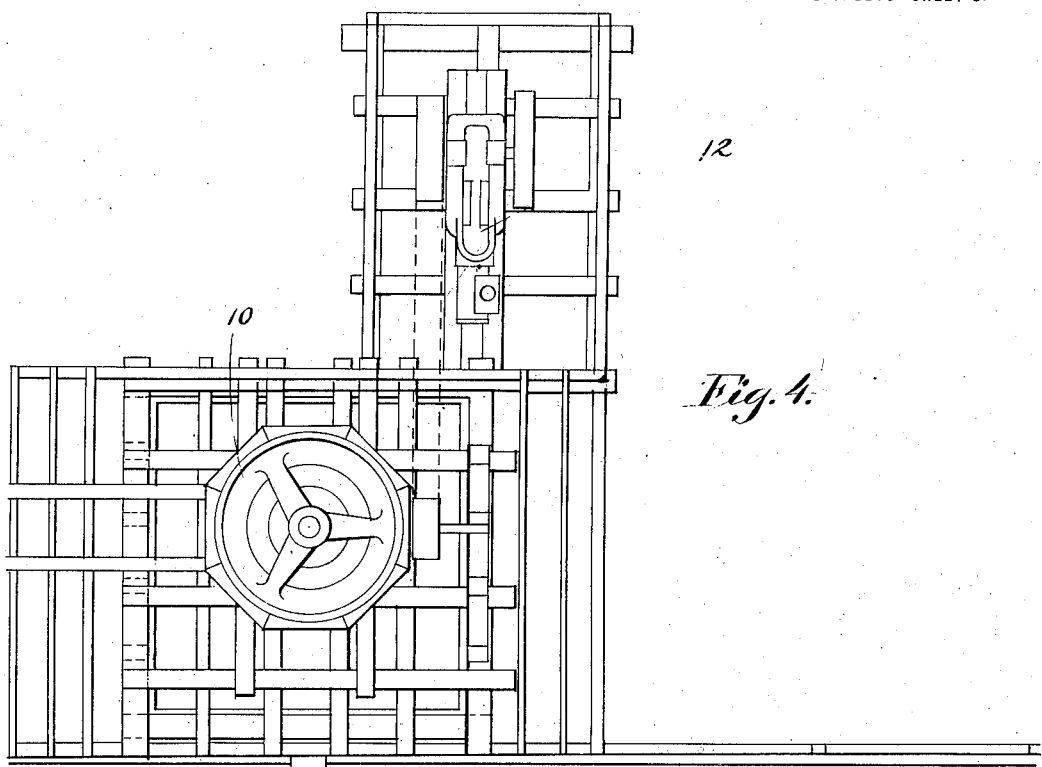
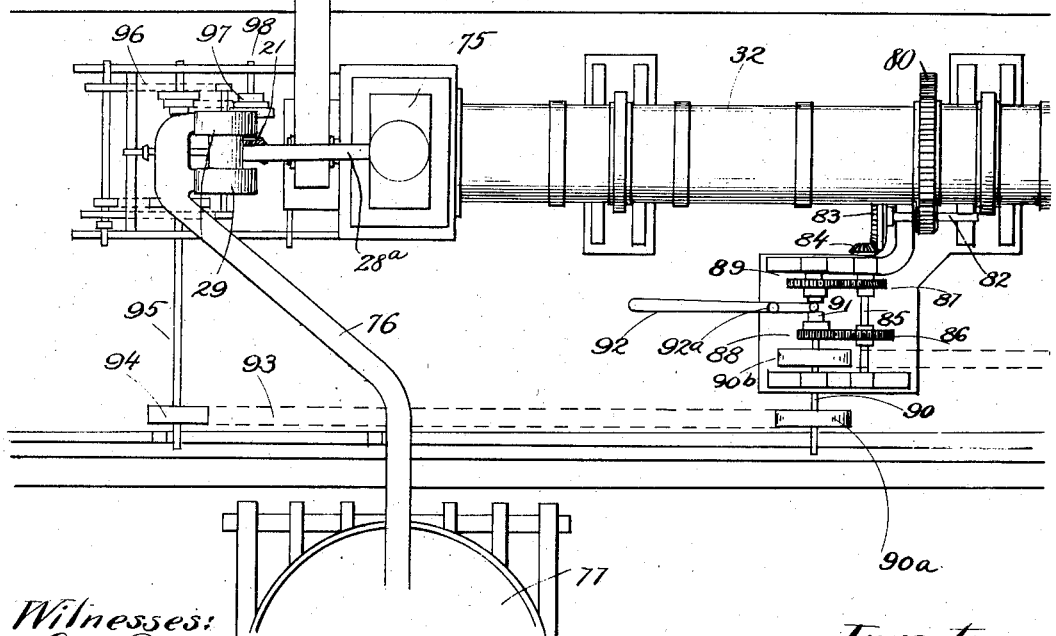

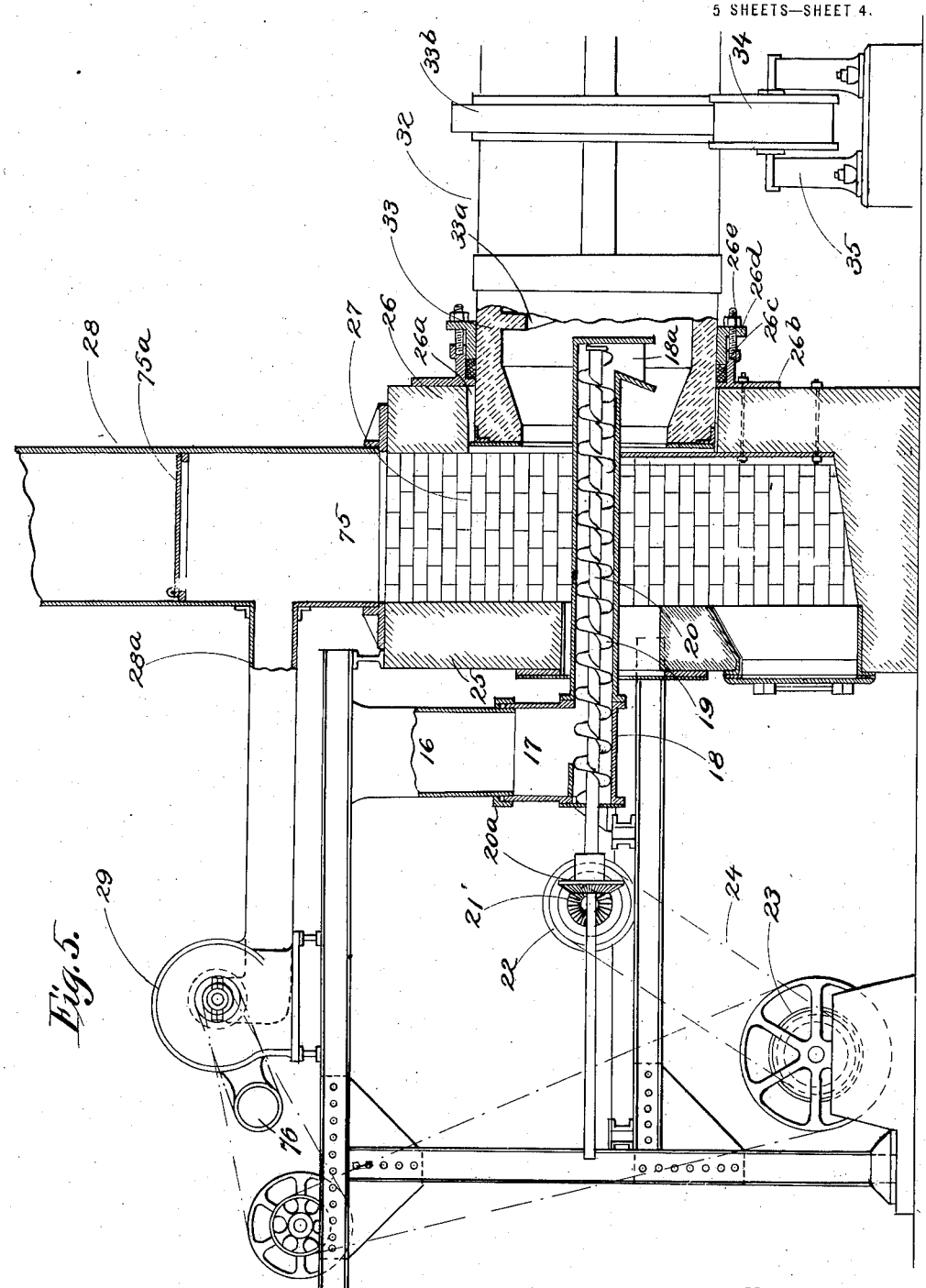

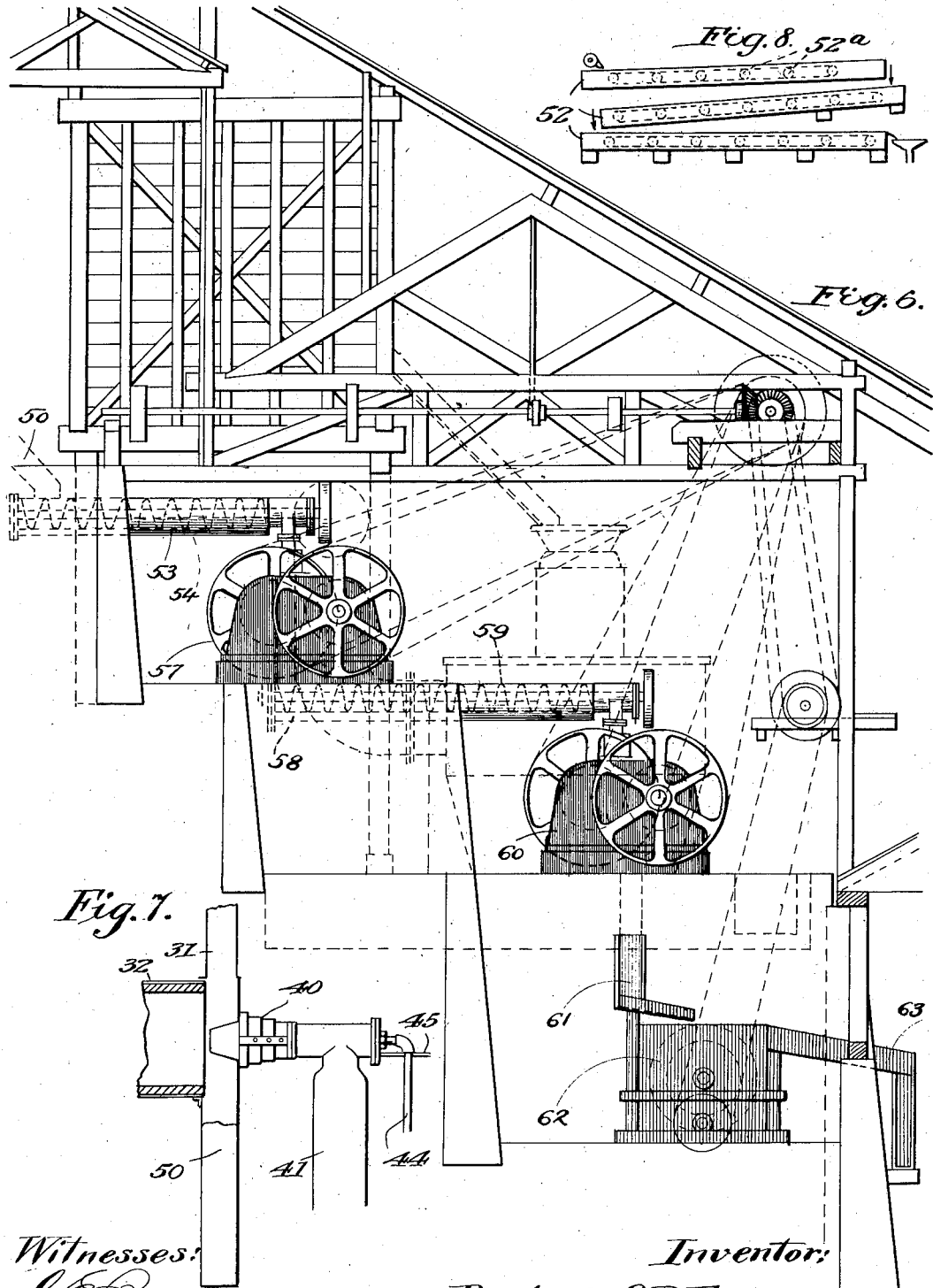

UNITED STATES PATENT OFFICE.

BENJAMIN Q. P. FOSS, OF SAN FRANCISCO, CALIFORNIA, ASSIGNOR TO THE FOSS INTERNATIONAL ORE REDUCTION COMPANY, OF SAN FRANCISCO, CALIFORNIA, A CORPORATION OF ARIZONA.

APPARATUS FOR DESULFURIZING AND TREATING ORE.

1,338,292. Specification of Letters Patent. Patented Apr. 27, 1920.

Application filed July 22, 1914. Serial No. 852,398.

*To all whom it may concern:*

Be it known that I, BENJAMIN Q. P. FOSS, a citizen of the United States, residing at San Francisco, in the county of San Francisco and State of California, have invented certain new and useful Improvements in Apparatus for Desulfurizing and Treating Ore, of which the following is a specification.

This invention relates to improvements in apparatus for desulfurizing and treating ore, and has for its object to provide an improved apparatus by which the ore may be handled as received from the mine and conducted through a series of operations, terminating in amalgamating means or in some instances upon concentrating tables.

By the use of my improved apparatus I am able to reduce comparatively hard ore such as metalliferous quartz or the like to a slimeless abrasion or granular pulp at a minimum expense and in a minimum time. I contemplate a preliminary crushing of the ore and reducing it to a size capable of passing through larger than a two inch mesh screen and then subjecting it to a comparatively intense heat for an interval short as compared with the processes now in use. After such heating the ore is subjected in an improved manner to the action of cold water, thereby reducing it to a friable state, whereupon it is crushed once or more to an abrasion or granular pulp which will be slimeless and ready for treatment by amalgamation or concentration, or both, as desired.

In conjunction with the above process I am able, by the use of my apparatus, to remove the volatilizable constituents of the ore and save the sulfur and the like from the sulfur or other gases which are driven off, at the same time condensing such gases and eliminating the danger commonly present in such treatment of the ore.

My invention also contemplates the arrangement and use of apparatus for utilizing unrefined producer gas to produce an incandescent flame in the drier, as I term it, and at the same time I introduce free hydrogen to increase the temperature of the fire and to expedite the saving of the sulfur and the like from the driven-off gases.

My invention also comprises the arrangement of apparatus for performing various operations in the treatment of ore upon different levels so that handling of the ore and transferring of the same from one operation to the successive operation is expedited and assisted.

These and other objects will be set forth more fully in the following specification and in the accompanying drawings, in which:

Figure 1 is a plan view of apparatus embodying my invention;

Fig. 2 is a flow diagram of the same;

Fig. 3 is an elevation of the same showing a top corner arrangement thereof;

Fig. 4 is a plan view of a portion of the apparatus;

Fig. 5 is a side elevation, partially in section, showing the suction fan and stack together with the means for conveying the ore to the drier and a portion of the drier;

Fig. 6 is an elevation of a portion of the apparatus, similar to that shown in Fig. 3 but drawn to a larger scale;

Fig. 7 is a vertical sectional view through the lower end of the drier showing the burner and outlet conduit;

Fig. 8 is a side elevation of the refrigerating tanks showing the cooling coils by dotted lines.

Like numerals refer to like elements throughout the drawings, in which:

The numeral 10 designates generally a crusher preferably of the type known as gyratory, supported upon a suitable framework indicated by numeral 11, and adapted to be operated by means of the member 12. A track 13 leads from the ore bins or the mine and is adapted to convey ore to the crusher by car.

As the ore is crushed to the desired size, in most instances in the use of my apparatus about No. 2 mesh, that is, capable of just passing through the screen of such mesh, it drops below the crusher into a suitable bin 15, or the like, from which a chute 16 leads to the hopper 17 of the cylindrical casing 18, as shown more particularly in Fig. 5. The chute 16 is provided with flanges closely fitting the inner and outer sides of the hopper 17 so that said chute forms a substantially air-tight connection with said hopper. The casing 18 is provided with the discharge outlet 18ª at its other extremity and a helical screw conveyer 19 carried by the shaft 20 is rotatably mounted therein as is the case with this well known type of conveyer. Upon rotation of the shaft 20 in the proper direction, ore received from the chute 17 will be transported through the conveyer casing 18 to and through the discharge outlet 18ª. The shaft 20 is provided with the beveled pinion 20ª outwardly of the casing 18, this pinion being in mesh with the beveled gear 21 driven by the pulley 22 which is in turn driven from the driving pulley 23 by the belt 24. The conveyer casing 18 extends through the walls 25—26 forming the front and rear walls of a gas chamber 27 which communicates with the upwardly projecting stack 28. The stack is provided with the communicating pipes 28ª through which blowers 29 or the like are adapted to extract and discharge the gases drawn from the drying or heating member 32, the uppermost end of which terminates in the opening 26ª in the wall 26. Secured to the wall 26 and surrounding the drier 32 is a stuffing box member 26ᵇ having the packing chamber 26ᶜ surrounding said drier. A packing gland 26ᵈ also surrounds the drier and fits within the packing chamber 26ᶜ to compress the packing material therein. The packing gland 26ᵈ may be adjusted in the packing chamber 26ᶜ by means of the studs 26ᵉ. By this construction a substantially air tight connection is formed between the drier and the walls of the gas chamber 27.

The heating member 32 is preferably constructed cylindrical in shape and is provided with the inner fire brick lining 33 and the helical screw or thread 33ª of any desired pitch. On its outer surface the drier or roaster is provided with the peripheral shoulders 33ᵇ which are supported upon the bearing rollers 34 carried by the supporting framework 35 and located in pairs at predetermined intervals along the length of the drier. This drier is inclined from one end downwardly toward the other and it is apparent that upon rotation thereof in the proper direction the screw 33ª will, owing to the inclination of the drier, give the ore a progressive forward and tumbling motion, thereby conveying said ore received from the conveyer casing 18 to the discharge end 31ª of said drier. The conduit 31 communicates with the interior of the drier 32 adjacent its lower end, as indicated by the numeral 31ª and passes upwardly through the roof of the mill for a purpose to be hereinafter set forth.

A burner 40 is inserted in the lower end of the drier 32 and the producer gas is supplied thereto through the pipe or conduit 41 leading from and communicating with the gas producers 42 which are located as closely as possible to the burner 40 and adapted to be charged through upper hoppers 42ª from the coal bin 43. This burner 40 is of a type arranged to utilize the crude producer gas and it is especially adapted for use with such gas generated from soft coal or lignite, air being supplied thereto under pressure, by means of a pipe 44 leading from the compressor 44ⁿ. A steam pipe 45 projects into the base of the burner and is adapted to supply steam thereto for a purpose to be hereinafter described. This burner, operating in conjunction with the hot producer gas and the steam conveyed thereto, is arranged to create an incandescent flame which extends upwardly more than half the length of the drier and substantially fills the entire cross section thereof, so that a sudden and rapid heating of the ore passing through the drier in contact with the flame is insured.

After the ore is conveyed to the lower end of the drier, the same is discharged through a chute or discharge 50, where it mingles with a supply of refrigerated water or similar fluid which is flowing into the discharge chute 50 from the tank 51 to which said fluid is supplied from a refrigerating system indicated by numeral 52, see Figs. 1 and 8. To provide for the efficient and rapid cooling of the refrigerant, I utilize a plurality of tanks 52, located above each other and inclined in opposite direction so as to cause a continuous circulation from one end of one tank downwardly to the other end thereof, thence into the next tank and so on to the collection tank 51, the refrigerating tanks 52 being supplied with suitable cooling coils 52ª. The discharge chute 50 communicates with the interior of a screw conveyer casing 53 in which is located a helical screw conveyer 54, this casing 53 being provided with a water jacket 53ª for cooling and being arranged to convey the ore which has been received from the chute 50 to the roll crusher 57 shown more particularly in Fig. 6, it being understood that while the ore is being conveyed through the casing 53 it is very thoroughly mixed with the continuously flowing stream of cooling fluid.

The ore having been exposed in the drier to the intense heat of the incandescent flame and the highly heated interior walls of the drier, it is found that all the volatile constituents of the ore have been driven therefrom and all lead and other fusible metals melted out of the ore and at the same time internal stresses have been set up between the particles of each piece of ore so that when said ore is suddenly subjected to contact with the refrigerating fluid the particles thereof will experience a violent tendency to readjust themselves to the new condition with the result that the ore will be rendered easily friable. Then upon passing through the crushing rolls of the crusher 57, the ore is reduced to a comparatively pulverized condition and is discharged into the casing 58 of a screw conveyer 59 which in turn conveys it to a second roller crushing machine 60. The crusher 60 finally reduces the ore to a slimeless abrasion or granular pulp and discharges it into a chute or hopper 61 from whence it flows into the amalgamating machine indicated by the numeral 62. After treatment by the amalgamators, if so desired, the ore may be passed on to chutes 63 and conveyed to the concentrating tables 64 for further treatment, or it may be passed directly from the crushing rolls to the concentrating tables from whence it may be conducted to a tailings pile or dump.

I provide for the rotation of the drier or roaster 32 by providing a circular toothed flange 80 which extends therearound to mesh with a gear 81, this gear being secured to and mounted upon the shaft 82 which also carries a beveled pinion 83. This beveled pinion is in mesh with the beveled gear 84 which is carried upon and driven by the shaft 85. This shaft is provided with the gears 86—87 of different size in constant mesh with the corresponding gears 88—89, loosely mounted upon the driving shaft 90. A clutch 91 is slidably mounted upon the shaft 90 to rotate therewith and is adapted to engage with either of the gears 88 or 89 to positively drive the same. The lever 92 pivoted at 92ª is provided to move the clutch 91 into engagement with either one of the gears 88 or 89. By this means I am enabled to vary the speed of rotation of my conveyer within certain limits when it becomes necessary to prolong or shorten the heating of the ore or to handle greater or less quantities thereof. The shaft 90 carries the pulley 90ª and fly-wheel 90ᵇ, the former being driven by the belt 93 which is in turn driven by the pulley 94 on shaft 95, this being driven by the step pulley 96 coacting with a similar step pulley 97 on the driving shaft 98, this shaft 98 also carrying the beveled gear 21, as shown in Figs. 4 and 5. A suitable power plant 100, see Fig. 1, is provided to furnish steam and power for the various parts of my apparatus.

While the ore is passing through the drier 32, the volatilizable constituents are volatilized and gases are formed which in many instances are largely sulfids which are not only harmful to vegetation but also to animal life when discharged into the surrounding atmosphere. I have, therefore, provided means for condensing these gases and collecting therefrom sulfur and other materials as valuable by-products. To accomplish this purpose I provide a box or chamber 75 in communication with the blowers 29, as shown in Fig. 1 and I place a damper or valve 75ª, shown most clearly in Fig. 5, located above the pipes 28ª at the bottom of the stack 28. This damper may be opened, or may open automatically to relieve abnormal pressures in the drier, but it is normally closed to prevent communication between the gas chamber 27 and the stack 28 while at the same time permitting gases to pass from said gas chamber through the chamber 75 to the pipes 28ª which, as above described, lead to the blowers 29. A conduit or duct 76 leads from the blowers 29 to a tank 77 and preferably extends downwardly thereinto a considerable distance. When it is desired to condense or treat the gases drawn from the roaster through the gas chamber 27, the gate or valve 75ª is closed as above described and gases discharged into the chamber 75 from the gas chamber 27 will flow through the conduit 76 and be discharged downwardly into the tank 77, the latter being filled with water or other condensing fluid in which the gases will be condensed and the by-products precipitated in a manner to be more specifically set forth hereinafter.

In the construction and operation of the apparatus above described, I locate the gas producers as closely as possible to the discharge end of the drier and the hot unrefined producer gas is passed directly through the conduit 41 to the burner 40 which is preferably of the type shown and described in my United States Patent No. 992,181. This gas has a temperature as it comes from the producers of from 1500° F. to 1800° F. and holds all of the elements of the coal or lignites in suspension to be utilized in combustion. The temperature is preferably maintained at 1800° F. by means of a thermostat. The gas being of such a high temperature overcomes precipitations in the pipes leading from the producer to the burner and also operates to disintegrate the superheated steam which is introduced into the burner through the pipe 45. The steam which is thus introduced into the base of the burner is broken up into hydrogen and oxygen and the hydrogen is thoroughly mixed with the hot producer gas in the burner before combustion takes place, the resulting mixture having a very high thermal value.

The construction and arrangement of apparatus which enables me to form a combustible gas capable of producing an incandescent flame having a very high temperature is one of the most important features of my invention. The air blast provides oxygen for the combustion of the producer gas, and the producer gas serves to maintain the combustion of the mixture which it forms with the hydrogen gas. The steam which is dissociated into hydrogen and oxygen by the intense heat in the burner acts in conjunction with the producer gas to produce a non-oxidizing reducing flame having a very high temperature. The combustion takes place a comparatively short distance from the burner within the interior of the drier or roaster, and, owing to the high thermal valve and high temperature of the gas mixture, and the method of burning the same, I am able to produce an extremely hot incandescent flame, which substantially fills the entire cross section of the drier and extends upwardly thereof substantially two-thirds of its length, so that the ore in its travel passes into direct contact with the hot flame and with the highly heated fire-brick walls of the roaster.

From the foregoing description it will be understood that the amount of air supplied to the interior of the drier is controlled by the operator, for the reason that all communication between the interior of the drier and the outer atmosphere may be controlled by the operator, with the exception of the passage through the pipe 31, which serves as an outlet or vent for the vapors arising from the refrigerated bath into which the hot air is discharged. A small amount of air introduced through the pipe 31 is taken up in combustion of the producer gas, and the combustion of the producer gas also consumes the oxygen introduced by the air blast, so that the additional oxygen needed for the combustion of the hydrogen is produced by the dissociation of the steam introduced into the base of the burner. All of the oxygen is thus consumed, and a non-oxidizing reducing flame is produced. It will be seen, therefore, that the atmosphere within the drier is capable of being automatically controlled, and since the incandescent flame substantially fills the entire cross section of the drier the operator is able to prevent the oxidation of materials introduced into the drier, while at the same time producing an incandescent flame which is very effective in reducing the ore. I am also able to control the temperature of the fire by means of the steam jet and by regulating the coal feed to the gas producers, and thus it will be understood that the fire and the atmosphere within the drier are both capable of being effectively controlled by the operator of the apparatus.

After the ore is broken up to the desired size by the crushers 10, it is introduced by positive feed at the speed desired through the conveyer 18 into the upper end of the drier. The continuously rotating drier having the helical thread on the inner wall thereof, serves to give the pieces of ore a progressive forward and tumbling motion toward the lower end of the drier. As the ore thus passes through the drier it is uniformly and thoroughly subjected to the influence of the intense heat of the incandescent flame and also to the heat arising from the interior fire-brick walls of said drier which become highly heated under the influence of said flame. This exposure of the pieces of ore to the intense heating influence arising from the sources mentioned, operates to drive off all volatile matter sulfur gases and the like and at the same time to create in said pieces of ore, a violent tendency of the particles of the ore to readjust themselves to the new condition. The intensity of the flame and the speed of the drier are preferably so adjusted that the internal stresses within the pieces of ore are at a maximum substantially at the time when the pieces reach the discharge end of the drier and I have found that this stage is indicated substantially in my apparatus by the corners and angles of the pieces of ore appearing slightly red. The ore is then discharged from the drier before the pieces have been heated to such a degree or for such a length of time as to cause a readjustment of the particles or molecules, this discharge being made into the chute 50 from whence the ore passes into the conveyer 53. It will be understood from the previous description that as the ore passes from the drier into the members 50 and 53 it is subjected to the influence of the continuously flowing refrigerated medium the action of which causes the pieces of ore heated, as above described, to be broken up and rendered friable, the vapors arising in the chute 50 passing up through the pipe 31 to the atmosphere. Owing to the fact that the cooling medium is a continuously flowing one, and maintained at all times at a relatively low temperature, it is found that the particles of ore are thoroughly subjected to the influence thereof, as they are carried along through the members 50 and 53 with said cooling medium. After being broken up and rendered friable, the ore passes from the members 50 and 53 through to the crushers, as above described.

As the ore passes through the drier the action of the heat in driving off the volatile matter, sulfur gases and the like is aided by the use of the steam which is introduced through the steam pipe 45, this steam being broken up into hydrogen and oxygen, the latter aiding the combustion of the producer gas and the former reacting with the gases drawn off from the ore. In treating ores which are comparatively heavy with sulfids, I have found that by treating the same in my drier the sulfids are driven off, either as pure sulfur, as sulfuric acid gas, or in some instances as oxid of sulfur. In the case of the first the pure sulfur gas is condensed upon its delivery into the tank 77 and the sulfur in the form of a powder rises to the top thereof and may be collected by any suitable means. The sulfuric acid gas passes into the liquid in the tank 77 and combines with the water or similar fluid as sulfuric acid until saturation is reached, after which point pure sulfur is formed and rises to the top as in the first instance. When sulfur dioxid forms, the hydrogen produced by the disintegration of the steam combines with the sulfur dioxid within the drier, forming either water and sulfur or sulfuric acid gas, in which latter event the action in the tank 77 is the same as in the second instance. The possibility of the formation of sulfur dioxid is largely limited, however, by the fact that I am able to control the atmosphere within the drier and produce a flame which is entirely a reducing flame and not an oxidizing flame.

Similarly the gases of arsenic, bismuth, zinc and the like are condensed in the tank 77 instead of being discharged into the atmosphere. All of these gases are drawn off from the upper end of the drier and discharged into the tank 77 with the sulfur gases, the sulfur floating to the top as a commercial product while the zinc, bismuth and arsenic pass to the bottom of the condenser. When the condenser is sufficiently charged with the last three mentioned products the discharge may be conducted to a second condenser and the three products stored until a large supply has been accumulated when they may be again passed through the roaster at a degree of heat sufficient only to melt the zinc, which degree of heat will volatilize the bismuth and arsenic which are again drawn into the condenser and saved while the zinc, as it leaves the end of the roaster in its molten form is run into pig-zinc ready for the market. In case any lead is contained in the ore being treated this metal will be melted and will flow downwardly through the roaster where it may be trapped at the lower end of the roaster before the ore drops into the refrigerated bath.

From the foregoing description it will be apparent that I have provided apparatus for reducing ore and rendering it easily friable in a very efficient manner and in a very short space of time compared with the processes now in use and at the same time I prevent the escape of poisonous gases to the surrounding atmosphere and save those gases by condensing them so as to produce valuable by-products in connection with the reduction of the ore. A very great advantage of my apparatus is that it may be operated continuously, there being no necessity of discontinuing the operation of one portion of the apparatus while another portion thereof is in operation. The ore is in substantially continuous motion from the time it leaves the crusher 10 until it passes from the rolls to the amalgamator or concentrating tables. In the operation of a mill capable of reducing 500 tons of ore per day, in which case the drier is substantially 60 ft. long, I find that the apparatus may be regulated to pass a charge of ore through the drier, drive off the volatile matter and heat the same to the required degree in from 2½ to 3 minutes, this short exposure to the intense heat of the incandescent flame and the highly heated interior walls of the drier being sufficient to create in the pieces of ore, internal stresses which cause them to soften and become friable when subjected to the action of the continuously flowing cooling medium. It will, therefore, be evident that a given charge of ore may be passed through my entire apparatus in a very short space of time thus rendering the output of treated ore very great with my apparatus as compared with other forms of apparatus for treating ore. It will be noted that successive steps in the process performed by my apparatus are located upon different levels where possible, thereby expediting the transference of the ore from one step to the successive step of said process.

While I have shown and described one specific form and arrangement of apparatus for accomplishing the objects of my invention, it will be understood that my invention may be embodied in other forms and arrangements of apparatus without departing from the spirit thereof as defined by the appended claims.

What I claim is:—

1. In apparatus for treating ore, means to heat the ore in a short space of time to a temperature sufficient to dry the same and remove the volatilizable constituents contained therein, means for maintaining the ore in motion during the contact thereof with said heating means, and means to supply refrigerated fluid to said ore immediately after said heating whereby said ore will be reduced to a friable state.

2. In apparatus for treating ore, means to heat the ore rapidly at a temperature sufficient to dry the same and to remove the volatilizable constituents contained therein, and means associated with said first-named means for preventing the oxidation of the constituents of said ore.

3. In apparatus for treating ore, means for crushing the ore to the desired size, means to expose said crushed ore to the action of an incandescent flame while it is in motion in an inclosed chamber, means to subject said ore after said exposure to said flame to the action of a continuously flowing cooling medium whereby it will be reduced to a friable state.

4. In apparatus for treating ore, a crusher adapted to reduce the ore to pieces of desired size, a heating member comprising a continuously rotating cylinder, said cylinder having a helical thrust in its inner surface to convey the ore therethrough, a burner arranged at one end of said cylinder and adapted to burn unrefined producer gas received from a gas producer located in close proximity thereto, and means to cause the heated ore to pass from said heating member into and with a continuously flowing stream of cooling fluid.

5. In apparatus for treating ore, means to crush the ore, means to effect a rapid heating of the crushed ore at a temperature sufficient to dry the same and remove the volatilizable constituents contained therein, and means for subjecting the heated ore to the action of a cooling fluid.

6. In apparatus for treating ore, means to subject the ore while in motion in an inclosed chamber to the action of a non-oxidizing reducing flame having a high temperature, means to convey the heated ore from said chamber, and means for subjecting the ore to the action of a cooling medium, whereby it is reduced to a friable state.

7. In apparatus for treating ore, means for crushing the ore, a roasting chamber, means for conveying the crushed ore to said roasting chamber, means for producing hydrogen gas, means for burning said gas in said chamber, and means for controlling the atmosphere in said chamber to prevent the presence of oxygen therein in excess of the requirements of combustion.

8. In apparatus for burning ore, means for crushing the ore, a roasting chamber comprising means for imparting motion to the crushed ore therein, a burner located in the wall of said chamber, means for introducing gas having a high temperature to said burner, means for conveying steam to said burner, and means for controlling the atmosphere in said chamber to prevent the presence of oxygen therein in excess of the requirements of combustion.

9. In apparatus for treating ore, a preliminary crushing member, a rotary drier, a screw conveyer arranged to receive ore from said crushing member and convey the same to said drier, means to continuously rotate said dryer, means to vary the speed of rotation thereof, a screw conveyer arranged to receive ore from said drier, and means to supply refrigerated fluid to said ore as the same is discharged from said drier.

10. In apparatus for treating ore, a rotary roaster, a burner located at one end of said roaster, means for introducing a fuel supply to said burner, means for introducing steam to said burner, means for supplying air to said burner under pressure in a quantity sufficient only to effect combustion of the fuel, and means communicating with the other end of said roaster for producing a suction therein.

11. In apparatus of the class described, a drier, a burner adapted to burn hot producer gas, means to introduce steam into said burner, and means to supply hot producer gas to said burner to disintegrate said steam and form therewith a gas mixture, whereby an incandescent flame is produced in said drier.

12. In apparatus of the class described, a drier, a burner adapted to burn hot producer gas, means to introduce steam into said burner, means to supply hot producer gas to said burner to disintegrate said steam and form therewith a gas mixture, whereby an incandescent flame is produced in said drier, and means to control the supply of air to said drier in order to supply sufficient oxygen for the combustion of said gas mixture only and to prevent the oxidation of materials introduced into said drier.

13. In apparatus of the class described, a tubular drier mounted to rotate about its longitudinal axis, said drier having a helical thread on the inner wall thereof, means to feed crushed ore to the upper end of said drier, means to rotate said drier whereby said ore is fed forward in said drier by means of the helical thread, a burner located at the end of said drier opposite said feeding means, and means associated with said burner for producing an incandescent flame in said drier throughout the major part of its length.

14. In apparatus of the class described, a rotatable drier adapted to advance crushed ore therethrough upon being rotated, means for rotating said drier, and means for producing an incandescent flame in said drier throughout the major part of the length thereof.

15. In apparatus of the class described, a rotatable drier, means to feed crushed ore into said drier adjacent one end thereof, a burner mounted in the end of said drier opposite said feeding means, means to introduce unrefined producer gas to said burner, and means to introduce a jet of superheated steam into said burner.

16. In apparatus of the class described, a rotatable drier, means to feed crushed ore into said drier adjacent one end thereof, a burner mounted in the end of said drier opposite said feeding means, means to introduce unrefined producer gas to said burner, means for introducing a jet of superheated steam into said burner, and means communicating with said drier adjacent said feeding means for producing a suction in said drier.

17. In apparatus for treating ore, means to heat the ore at a temperature sufficient to dry the same and remove the volatilizable constituents contained therein without oxidation, and means for saving and recovering the volatilizable constituents driven off from said ore.

18. In apparatus for treating ore, means to heat the ore at a temperature sufficient to dry the same and remove the volatilizable constituents contained therein, means for drawing off the volatilizable constituents and saving the same, and means for subjecting the heated ore to the action of a cooling medium for rendering it friable.

19. In apparatus for treating ore, a rotary roaster, means for rotating said roaster, means for conveying ore to one end of said roaster while preventing the entrance of air thereto, a closed chamber communicating with said end of said roaster, means for forming an air-tight connection between said chamber and rotary roaster, means for producing a suction in said chamber, means for burning fuel in the other end of said roaster to produce an incandescent flame therein, means for supplying air to said other end of said roaster in a quantity sufficient only to supply the requirements of combustion, means for conveying said ore continuously from said last-mentioned end to said roaster, and means for subjecting the heated ore to the action of a cooling fluid.

In testimony whereof, I have subscribed my name.

BENJAMIN Q. P. FOSS.

Witnesses:
   GEO. F. WARDMAN,
   GEO. MAYDEN.